E. HARRIS.
Revolving Rake.
No. 24,631.  Patented July 5, 1859.
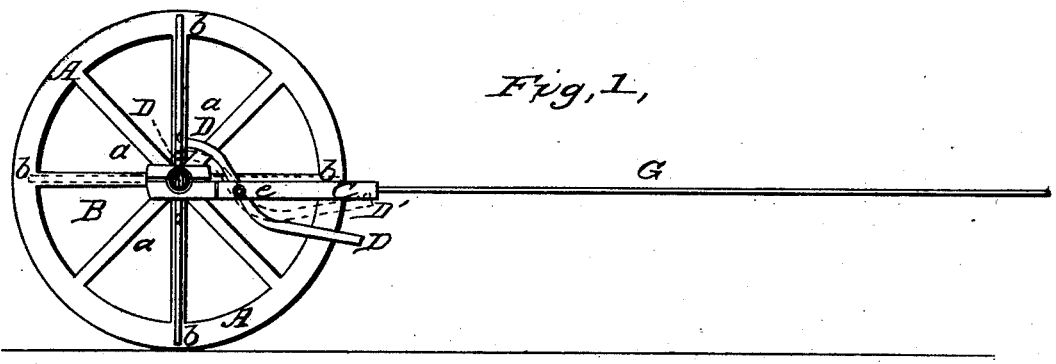
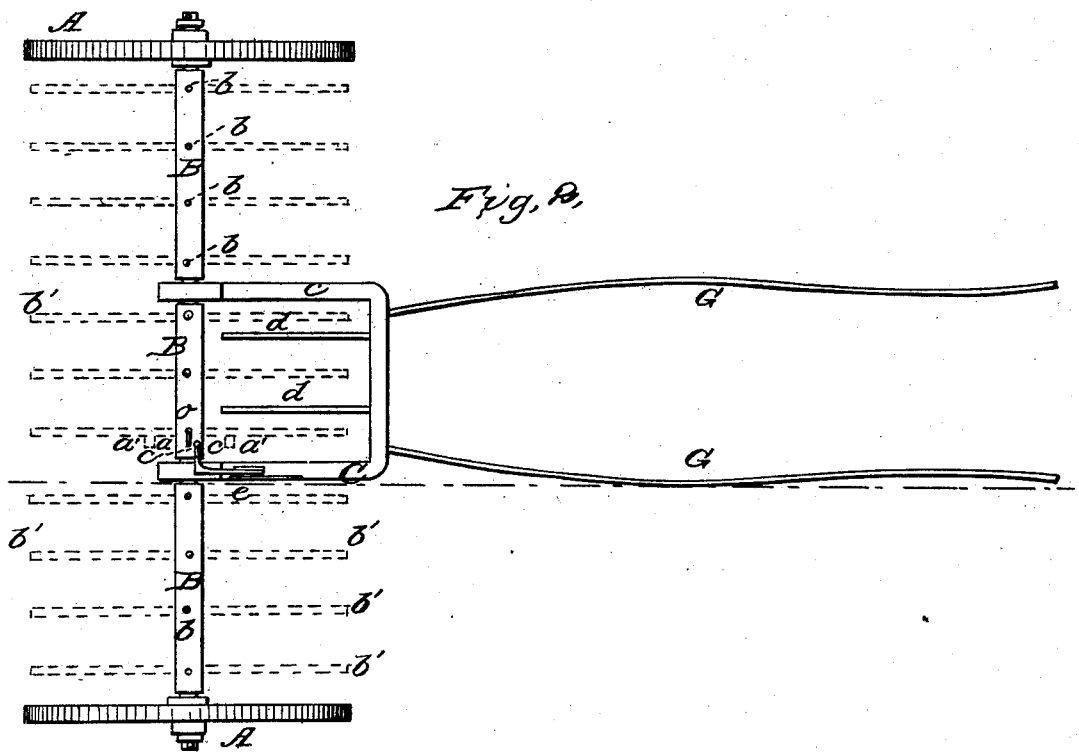
Witnesses:
J. Clough Harris
Harry O'Brown
Inventor:
Elijah Harris

UNITED STATES PATENT OFFICE.

ELIJAH HARRIS, OF PRINCETON, ILLINOIS.

IMPROVEMENT IN HORSE-RAKES.

Specification forming part of Letters Patent No. 24,631, dated July 5, 1859.

*To all whom it may concern:*

Be it known that I, ELIJAH HARRIS, of the town of Princeton, in the county of Bureau and State of Illinois, have invented certain new and useful Improvements in Grain and Hay Rakes; and I do hereby declare that the following is a full, clear, and exact description of the construction and operation of the same, reference being had to the annexed drawings, making a part of this specification, in which—

Figure 1 is an end view, showing the farther wheel, the shaft at the point of its connection with the lever-truck, and a side view of discharge-lever; Fig. 2, a top view of rake, showing the arms of discharge-lever and the manner of its holding the rake.

The nature of my invention consists in providing a grain or hay rake with a discharge-lever, D, which, commencing at a point even with the front bar of the lever-truck C, runs back on the under side of the same about two-thirds of its length, when it is bent and passed through one or both sides of the truck, pivoted at $e$, which pivot forms the fulcrum of the lever. After passing through the truck it is again bent at a line nearly parallel with its arm, at the end of which is a side projection or finger, $c$, which, coming in contact with a similar projection, $a$, on the tooth passing nearest to it, holds the rake in place while in operation until the pressure of the accumulated matter beneath lifts the lever and allows the rake to discharge itself.

To enable others skilled in the art to make and use my invention, I will proceed to describe its construction and operation.

The wheels A are made like ordinary carriage-wheels. The shaft or axle B is made of wood, round, and about six feet in length. Any length, however, may be used. It is filled with teeth $b\ b$, which are of equal length on the sides, and may be made of wood or steel in the ordinary manner, except those which are made with the projections $a\ a$, which projections are on the side toward the lever, corresponding in position with the height of the lever D, above the axle or shaft. When the rake is in motion the grain or hay accumulates upon the teeth $b\ b$, and as it increases to the desired bulk presses against the arms of the lever $d\ d$, which are attached to a bent portion or forearm of the lever D, thereby raising it, which produces a depression of the end with finger $c$, causing it to pass below the projection $a$ on the teeth. When the rake revolves, passing over the grain or hay gathered, and the axes at the points where the axle or shaft turns in the lever-truck C, being made of less size than those upon which the wheels revolve, cause the rake to revolve with the wheels, thus making it assume its proper position for raking as soon as it has discharged itself. The lever D should, for durability, be made of iron. To the rake thus constructed an ordinary pair of thills are attached to the lever-truck C, when the rake will be complete.

What I claim as my invention, and desire to secure by Letters Patent, is—

The lever D, with the arms $d\ d$, and the projection or finger $c$, in combination with the stop $a$, substantially as set forth and specified.

ELIJAH HARRIS.

Witnesses:
J. CLOUGH HARRIS,
HENRY O. BROWN.